(12) United States Patent  (10) Patent No.: US 7,624,572 B2
Lin  (45) Date of Patent: Dec. 1, 2009

(54) EXHAUST TREATMENT DEVICE MONITORING SYSTEM

(75) Inventor: George Lin, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 834 days.

(21) Appl. No.: 11/023,458

(22) Filed: Dec. 29, 2004

(65) Prior Publication Data

US 2006/0137331 A1    Jun. 29, 2006

(51) Int. Cl.
  *F01N 3/00* (2006.01)
(52) U.S. Cl. .............................. 60/299; 60/274; 60/297; 60/311
(58) Field of Classification Search ................... 60/274, 60/276, 295, 297, 311
  See application file for complete search history.

(56) References Cited

U.S. PATENT DOCUMENTS

| | | | |
|---|---|---|---|
| 3,963,447 A | 6/1976 | Hayashi | |
| 4,647,220 A | 3/1987 | Adams et al. | |
| 5,067,973 A * | 11/1991 | Pattas | 95/12 |
| 5,307,626 A | 5/1994 | Maus et al. | |
| 5,421,719 A * | 6/1995 | Saito et al. | 431/7 |
| 5,651,248 A | 7/1997 | Kawamura | |
| 5,718,511 A | 2/1998 | Mundt | |
| 5,722,236 A | 3/1998 | Cullen et al. | |
| 5,929,320 A | 7/1999 | Yoo | |
| 6,449,944 B1 | 9/2002 | Yasui et al. | |
| 6,546,721 B2 | 4/2003 | Hirota et al. | |
| 6,622,480 B2 | 9/2003 | Tashiro et al. | |
| 6,651,422 B1 | 11/2003 | LeGare | |
| 6,708,487 B2 * | 3/2004 | Morimoto et al. | 60/311 |
| 6,758,595 B2 | 7/2004 | Seitz | |
| 6,763,659 B2 * | 7/2004 | Watanabe et al. | 60/297 |
| 6,770,116 B2 | 8/2004 | Kojima | |
| 6,802,180 B2 * | 10/2004 | Gabe et al. | 60/285 |
| 6,969,413 B2 * | 11/2005 | Yahata et al. | 55/282.3 |

FOREIGN PATENT DOCUMENTS

| | | |
|---|---|---|
| JP | 56092320 | 7/1981 |
| JP | 59018220 | 1/1984 |
| JP | 05156928 | 6/1993 |
| JP | 05240025 | 9/1993 |
| JP | 07102993 | 4/1995 |

* cited by examiner

*Primary Examiner*—Thomas E. Denion
*Assistant Examiner*—Diem Tran
(74) *Attorney, Agent, or Firm*—Finnegan, Henderson, Farabow, Garrett & Dunner

(57) ABSTRACT

An exhaust system is provided having an exhaust path configured to direct an exhaust stream away from an engine. The system may also include an exhaust treatment device in the exhaust path and configured to act on one or more substances in the exhaust stream. Further, the system may include at least one temperature sensing device configured to provide an output indicative of a temperature at one or more locations on a working material of the exhaust treatment device. In addition, the system may include a controller configured to generate a temperature map of the working material of the exhaust treatment device and to determine deviations from an expected temperature map.

31 Claims, 4 Drawing Sheets

EXHAUST TREATMENT DEVICE MONITORING SYSTEM

TECHNICAL FIELD

The present disclosure is directed to an exhaust treatment device monitoring system, and more particularly to an exhaust treatment device monitoring system configured to determine a condition of the exhaust treatment device based on temperature information.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, exhaust emission standards have become more stringent. The amount of particulates and gaseous pollutants emitted from an engine may be regulated depending on the type, size, and/or class of engine. In order to meet these emissions standards, engine manufacturers have pursued improvements in several different engine technologies, such as, for example, fuel injection, engine management, and air induction, to name a few. In addition, engine manufacturers have developed devices for treatment of engine exhaust after it leaves the engine.

Engine manufacturers have employed exhaust treatment devices called particulate traps to remove the particulate matter from the exhaust flow of an engine. A particulate trap is a filter designed to trap particulate matter. The use of the particulate trap for extended periods of time, however, may enable particulate matter to build up on the filter, thereby causing the functionality of the filter and/or engine performance to decline.

One method of restoring the performance of a particulate trap may be to implement regeneration. Regeneration of a particulate trap filter system may be accomplished by increasing the temperature of the filter and the trapped particulate matter above the combustion temperature of the particulate matter, thereby burning away the collected particulate matter and regenerating the filter system.

Engine manufactures have also employed catalytic materials (catalysts) to chemically purify exhaust gases. Catalyst-based treatment devices may include catalysts that promote removal of selected pollutants from an exhaust stream by oxidizing and/or reducing particular gaseous compounds in the exhaust. These may include $NO_x$, carbon monoxide (CO), or any other gaseous compound desired to be removed from the exhaust stream. A catalyst-based treatment device, such as a NOx adsorber, may also be regenerated by simply running the engine with a rich air-fuel mixture.

Temperature can be an important factor with regard to both particulate traps and catalyst-based treatment devices. Particularly, excessive heat from various sources in an exhaust system can cause performance losses and/or mechanical failures of particulate traps and catalyst-based treatment devices. These sources of heat may include the exhaust gas supplied to the exhaust treatment devices, regeneration of the devices, and exothermic reactions. Also, some exhaust treatment devices may not perform at their full potential at temperatures that are too low. For example, regeneration may be best achieved above a particular temperature. Additionally, chemical reactions that take place in catalyst-based treatment devices may also occur most effectively above a particular temperature.

Abnormal operating temperatures may be indicative of problems with the exhaust treatment devices. For example, structural and/or mechanical failures of an exhaust treatment device may alter flow paths of exhaust gases, resulting in increases or decreases in flow through particular sections of an exhaust treatment device. Increases or decreases in flow may result in corresponding increases or decreases in the operating temperature and/or the rate of change of the operating temperature through those particular sections.

By monitoring the temperature of exhaust treatment system components, the exhaust treatment may be controlled to prevent the components from being subjected to destructively high temperatures and/or to maintain the operating temperatures within a desired range. Systems have been proposed for reducing damage caused by heat in exhaust treatment system components. For example, U.S. Pat. No. 6,622,480, issued on Sep. 23, 2003 to Tashiro et al. ("the '480 patent) discloses an exhaust treatment system including a catalytic particulate filter. The '480 patent further discloses closed loop feedback control of regeneration of the particulate filter based on exhaust temperatures measured immediately upstream and downstream of the particulate filter in an attempt to minimize damage to the components that may result from excessive heat.

While the system of the '480 patent may monitor the overall temperature of the particulate filter, the system of the '480 patent has several drawbacks. For example, it does not monitor deviations in temperature at localized portions of the particulate filter. Localized temperature deviations may be indicative of local structural failures in an exhaust treatment device that could possibly result in significant loss of performance and/or more extensive damage to the exhaust treatment device or other components of the engine or exhaust system.

The disclosed exhaust treatment device monitoring system is directed toward overcoming one or more of the problems set forth above.

SUMMARY OF THE INVENTION

In one aspect, the present disclosure is directed to an exhaust system having an exhaust path configured to direct an exhaust stream away from an engine. The system may also include an exhaust treatment device in the exhaust path and configured to act on one or more substances in the exhaust stream. Further, the system may include at least one temperature sensing device configured to provide an output indicative of a temperature at one or more locations on a working material of the exhaust treatment device. In addition, the system may include a controller configured to generate a temperature map of the working material of the exhaust treatment device and to determine deviations from an expected temperature map.

In another aspect, the present disclosure is directed to a method of monitoring an exhaust treatment device. The method may include directing an exhaust stream from an engine to the exhaust treatment device. The method may also include generating a temperature map of a working material of the exhaust treatment device and determining deviations from an expected temperature map.

In another aspect, the present disclosure is directed to a work machine having an operator station, a frame, at least one traction device, and an internal combustion engine. The work machine may also include an exhaust path configured to direct an exhaust stream away from the internal combustion engine and an exhaust treatment device in the exhaust path and configured to act on one or more substances in the exhaust stream. In addition, the work machine may include at least one temperature sensing device configured to provide an output indicative of a temperature at one or more locations on a working material of the exhaust treatment device. Further, the work machine may include a controller configured to generate a temperature map of the working material of the exhaust treatment device and to determine deviations from an expected temperature map.

DETAILED DESCRIPTION

Reference will now be made in detail to the drawings. Wherever possible, the same reference numbers will be used throughout the drawings to refer to the same or like parts.

Figure 1:
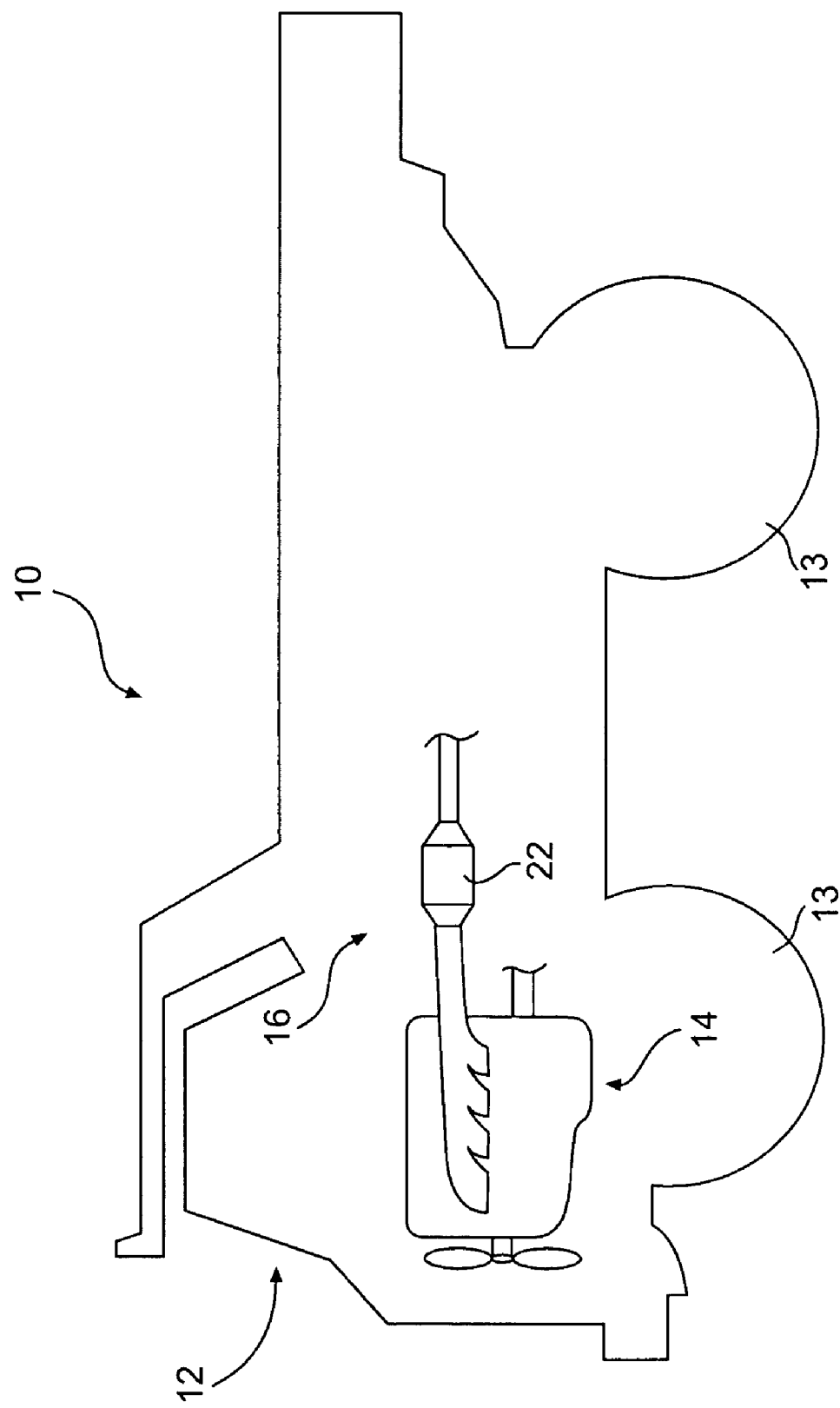
FIG. 1 is a diagrammatic illustration of a work machine according to an exemplary disclosed embodiment.

FIG. 1 illustrates a work machine 10. Work machine 10 may include an operator station 12. Work machine 10 may further include one or more traction devices 13, an engine 14, and an exhaust system 16.

Although work machine 10 is shown as a truck, work machine 10 could be any type of machine having an exhaust producing engine. Accordingly, traction devices 13 may be any type of traction devices, such as, for example, wheels, as shown in FIG. 1, tracks, belts, or any combinations thereof.

Engine 14 may be any kind of engine that produces an exhaust stream. For example, engine 14 may be an internal combustion engine, such as a gasoline engine, a diesel engine, a natural gas engine or any other exhaust producing engine.

Figure 2:
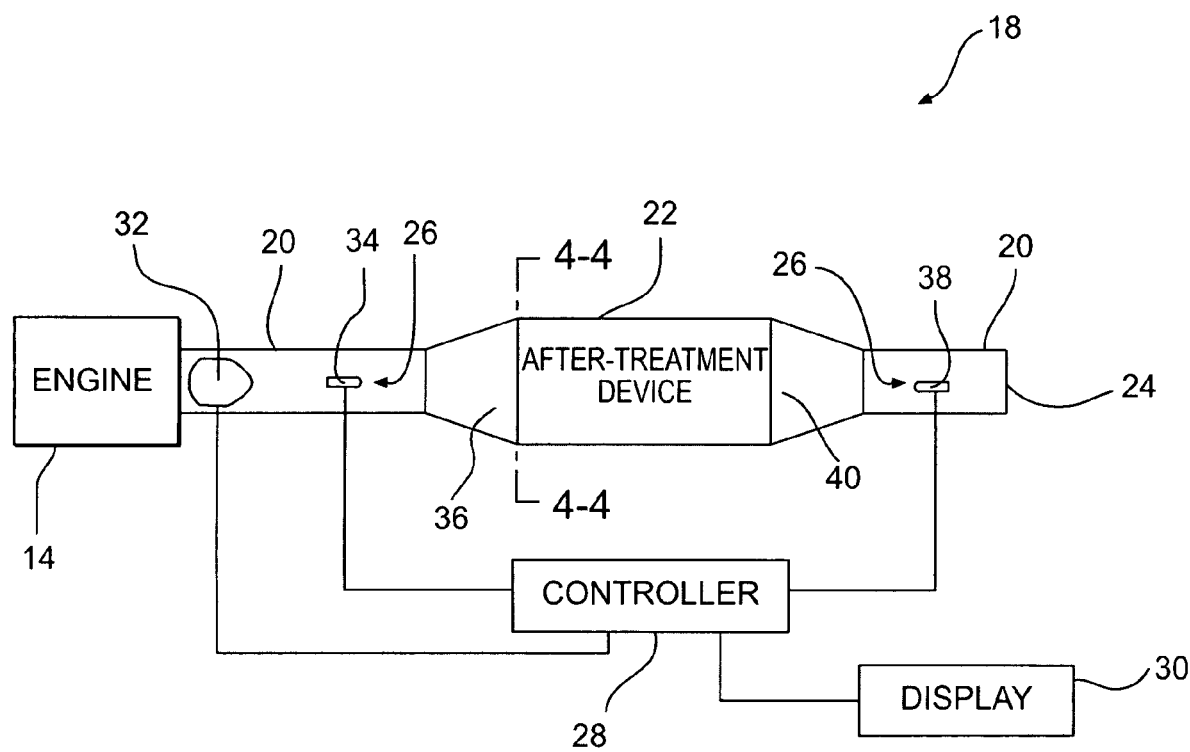
FIG. 2 is a diagrammatic illustration of an exhaust treatment device monitoring system according to an exemplary disclosed embodiment.

FIG. 2 illustrates an exhaust treatment device monitoring system 18. System 18 may include engine 14. System 18 may further include an exhaust path, which may include an exhaust conduit 20 configured to route an exhaust stream of exhaust gases produced by engine 14 to an exhaust treatment device 22. Downstream from exhaust treatment device 22, the exhaust gases may be vented to the atmosphere through an outlet 24 of exhaust conduit 20. System 18 may also include one or more temperature sensing devices 26. Information from temperature sensing devices 26 may be monitored by a controller 28. Controller 28 may also be configured to process and/or output the information to a display 30. Controller 28 may be further configured to output the information to one or more external data storage and/or processing devices (not shown).

Exhaust treatment device 22 may include any type of device configured to act on one or more substances in the exhaust stream produced by engine 14. Exhaust treatment device 22 may include at least one working material configured to act mechanically and/or chemically on the one or more constituents of the exhaust stream. The working material may include any material, structure, or component of exhaust treatment device 22 that may be mapped for temperature.

Figure 4A:
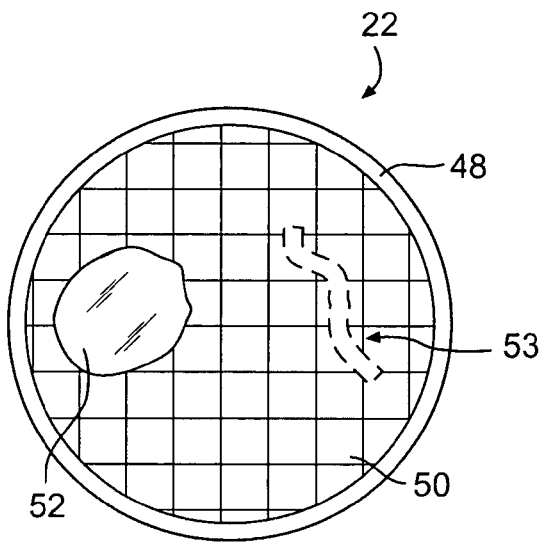
FIG. 4A is a diagrammatic cross-sectional illustration of an exhaust treatment device taken at 4-4 in FIG. 2 according to an exemplary disclosed embodiment.

Exhaust treatment device 22 may include a particulate trap configured to filter particulate matter from the exhaust stream. A possible working material for a particulate trap may include a filter or filtration material (e.g., a metal mesh, as shown in FIG. 4A) for trapping particulate matter.

Alternatively or additionally, exhaust treatment device 22 may include a catalyst-based treatment device. For a catalyst-based treatment device, the working material may include one or more catalyst-coated or impregnated support materials (e.g., cordierite, alumina, zeolite, etc.) for chemically altering one or more gaseous compounds in the exhaust stream of engine 14. A catalyst support structure may include any structure that provides a surface area on which a catalytic material may be carried. Further, the support structure itself may have catalytic properties.

Figure 4B:
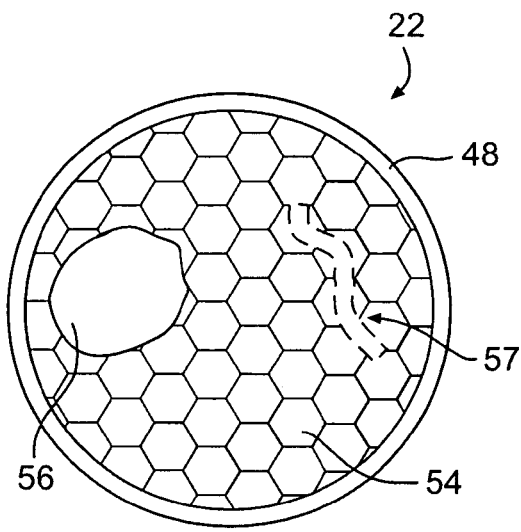
FIG. 4B is a diagrammatic cross-sectional illustration of another exhaust treatment device taken at 4-4 in FIG. 2 according to an exemplary disclosed embodiment.

The working material for a catalyst-based treatment device may include, for example, a series of elongate, tubular passages arranged in a honeycomb structure (see FIG. 4B). Exhaust gases may flow through the tubular passages and catalytic material on the walls of the passages may chemically alter one or more species in the exhaust stream. For example, a catalyst-based treatment device may include one or more catalytic materials adapted to convert undesirable compounds (e.g., carbon monoxide (CO), nitrogen oxides ($NO_x$), hydrocarbons (HC), etc.) into more acceptable compounds (e.g., carbon dioxide ($CO_2$), Nitrogen ($N_2$), water ($H_2O$), etc.).

System 18 may include more than one exhaust treatment device 22. Further, system 18 may include more than one of the same type of exhaust treatment device (e.g., multiple particulate traps), or may include different types of exhaust treatment devices. For example, system 18 may include one or more particulate traps and one or more catalyst-based treatment devices. Further, two types of exhaust treatment devices may be combined into one unit, such as, for example, a catalyzed particulate trap.

System 18 may also include a regeneration device 32 configured to maintain or restore the performance of exhaust treatment device 22. Accumulation of exhaust stream constituents in exhaust treatment device 22 may result in a decline in engine performance and/or possible damage to exhaust treatment device 22 and/or other components of system 18. For example, regeneration device 32 may be configured to burn off soot that has accumulated in a particulate trap. Regeneration device 32 may include any type of device configured to raise the temperature of exhaust treatment device 22, such as, for example, burners, electrical heating elements, etc.

In addition to or in lieu of regeneration device 32, engine 14 may be configured to regenerate exhaust treatment device 22. For example, by operating with a rich air-fuel mixture, engine 14 can promote regeneration of certain types of exhaust treatment devices. $NO_x$ adsorbers, for example, may be regenerated in such a manner. Rather than simply converting compounds in the exhaust stream as they pass through, $NO_x$ adsorbers convert $NO_x$ to another compound which may be stored within the adsorber. Having a finite capacity for storage of such compounds, the compounds should be released periodically in order to maintain the effectiveness of the $NO_x$ adsorber. Running engine 14 rich for a short period of time produces increased amounts of species such as HC and CO in higher concentrations. These species can react with the stored compounds in the $NO_x$ adsorber to produce compounds, such as $N_2$ and $CO_2$, that can be expelled from the $NO_x$ adsorber.

Temperature sensing devices 26 may be configured to determine temperatures of a working material in one or more portions of exhaust treatment device 22. Temperature sensing devices 26 may be located at any suitable location. For example, temperature sensing devices 26 may be located within exhaust conduit 20 nearby or adjacent to exhaust treatment device 22. Alternatively or additionally, temperature sensing devices 26 may be attached to or located within exhaust treatment device 22.

In one embodiment, temperature sensing devices 26 may include an upstream temperature sensor 34, which may be configured to determine a temperature profile of a surface area of working material at an inlet end 36 of exhaust treatment device 22. That is, upstream temperature sensor 34 may be configured to determine the temperatures of various portions of the surface area of working material. Temperature sensing devices 26 may also include a downstream temperature sensor 38, which may be configured to determine a temperature profile of a surface area of working material at an outlet end 40 of exhaust treatment device 22.

Temperature sensing devices 26 may include one or more infrared temperature sensors. For example, temperature sensing devices 26 may include an infrared sensor array. Such an infrared sensor array may include multiple infrared sensor units, each configured to determine a temperature of a designated section of working material surface area. With these multiple sensor units, variations in temperature between sections of working material surface area may be detected.

The temperature measurements from the designated sections may establish a temperature map of the surface area. The temperature map may include any set of temperature measurement data. For example, the temperature map may include one or more temperature measurement values associated with exhaust treatment device 22.

Controller 28 may be configured to process the temperature map data. For example, controller 28 may be configured to compile the temperature measurements taken by temperature sensing devices 26. Controller 28 may also be configured to generate a temperature map of a portion of working material surface area. In addition, controller 28 may be configured to compare the generated temperature map to a predetermined or expected temperature map stored in memory to determine deviations from the expected temperature map. For example, controller 28 may determine whether any of the temperatures measured by temperature sensing devices 26 deviate from an expected temperature or fall outside of an expected range of temperatures. Such deviations may be indicative of abnormal operating conditions, which could be due to malfunctions or failures of one or more components of exhaust treatment device 22 and/or other components of system 18.

Additionally, controller 28 may be configured to compare the temperature map of inlet end 36 with that of outlet end 40. Controller 28 may be configured to determine flow distribution through exhaust treatment device 22 based on this comparison. Controller 28 may also be configured to compare the determined flow distribution with an expected flow distribution. Any deviations from the expected flow distribution may indicate one or more problems with exhaust treatment device 22.

Further, controller 28 may be configured to enhance the temperature map in order to make temperature variations more readily discernable (e.g., to the naked human eye, or by machine interpretation). For example, controller 28 may be configured to generate a histogram expansion of the temperature map to more clearly define or otherwise represent variations in temperature and/or deviations from expected temperatures throughout the map. A histogram expansion may amplify the variations in temperature by spreading out the temperature measurements over a broader scale. For example, if temperature sensing devices 26 measure temperatures that range from 1 degree to 10 degrees, a histogram expansion may represent the temperatures on a scale from 1 to 40 units. Therefore, a temperature of 2 degrees may be represented by the value 8, and a temperature of 3 degrees may be represented by the value 12. Thus, a temperature difference of 1 degree may be amplified to a difference of 4 units on the expanded scale. A machine that may be determining deviations from an expected temperature range may recognize the amplified difference more easily (e.g., with less processing of the data). Further, histogram expansion may enable the human eye to more readily discern temperature variations in a displayed temperature map, as will be discussed in greater detail below.

Controller 28 may also be configured to generate a map of a rate of temperature change of the working material. For example, upon a cold start of engine 14, controller 28 may monitor the temperatures of the working material as the system heats up to normal operating temperature. Controller 28 may compare a series of stored temperature maps generated over a period of time. Controller 28 may generate the rate of temperature change map based on this comparison. Controller 28 may be further configured to determine deviations from an expected rate of temperature change. Areas where the working material has failed may not change in temperature at the same rate as normally expected.

Figure 3:
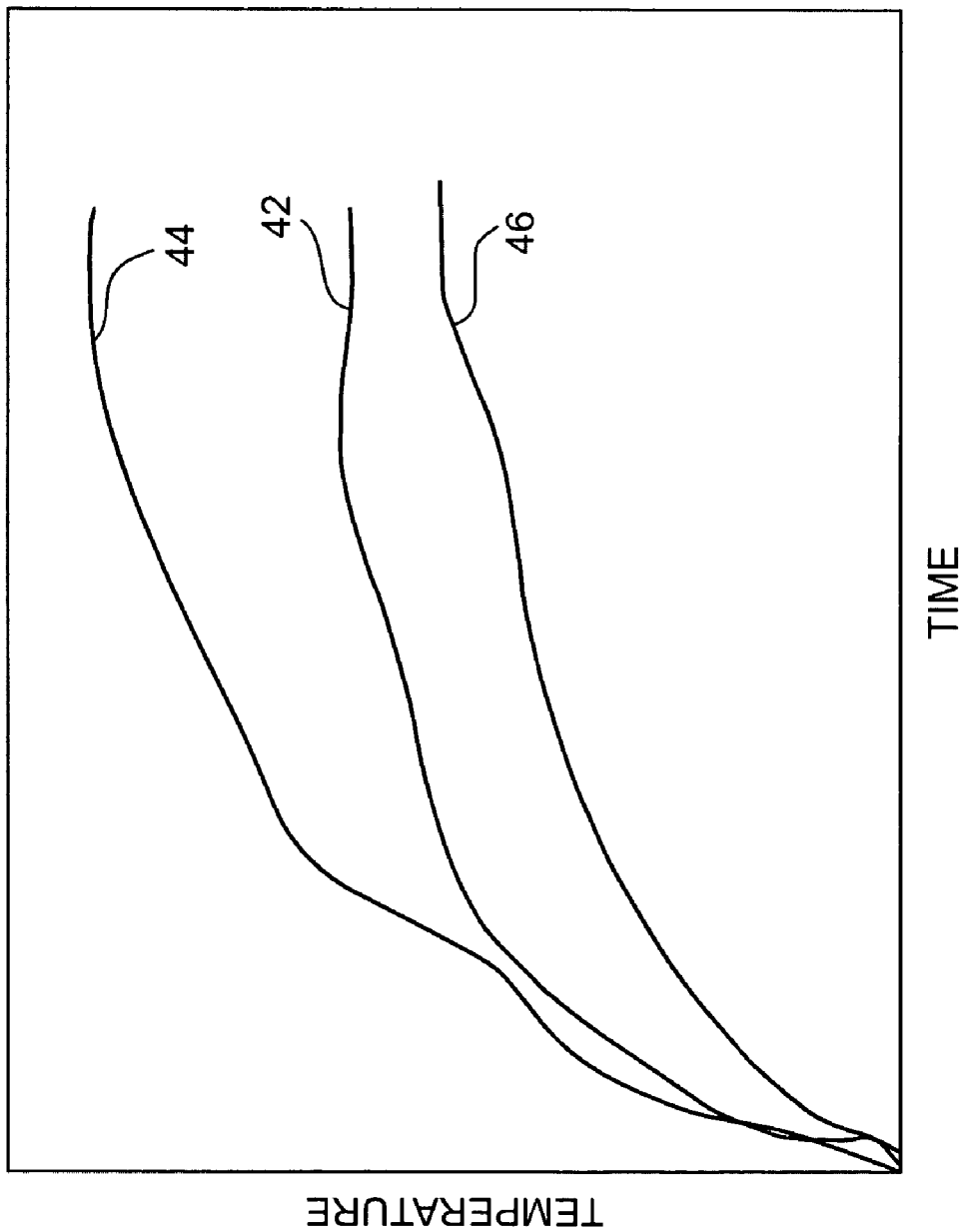
FIG. 3 provides an exemplary temperature vs. time graph according to a disclosed embodiment.

FIG. 3 is a graph illustrating working material temperatures measured over a period of time. A line 42 represents a possible expected temperature increase over time. A line 44 represents a possible temperature increase that occurs more rapidly than expected. This may indicate a possible crack in the working material that may be causing abnormally high flow in a particular section of the working material. The increased flow may cause an increase in the amount of heat transferred and/or an increase in the rate heat is transferred to the working material from the exhaust gases. A line 46 represents a possible temperature increase that occurs more slowly than expected. This may indicate a possible fusion or other kind of blockage of the working material causing a reduction in flow in a particular section of the working material. The reduction in flow may result in a decrease in the amount of heat transferred and/or the rate that heat is transferred to the working material from the exhaust gases.

In addition, controller 28 may be configured to output temperature map data to display 30 to display the temperature maps. Display 30 may be located at any suitable location on work machine 10, such as, for example, in operator station 12. Display 30 may be any kind of display, including screen displays, such as, for example, cathode ray tubes (CRTs), liquid crystal displays (LCDs), plasma screens, and the like. In addition to providing visual feedback regarding the operating temperatures of exhaust treatment device 22, display 30 may also provide other information regarding system 18 or any other device and/or system associated therewith.

Figure 4C:
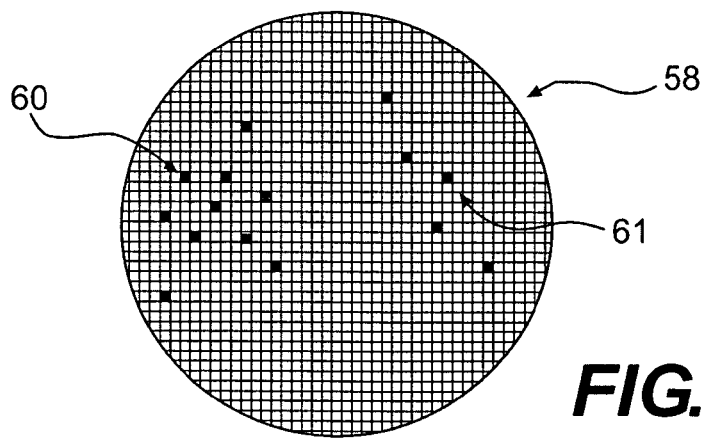
FIG. 4C is a diagrammatic illustration of a sample temperature map image according to an exemplary disclosed embodiment.
Figure 4D:
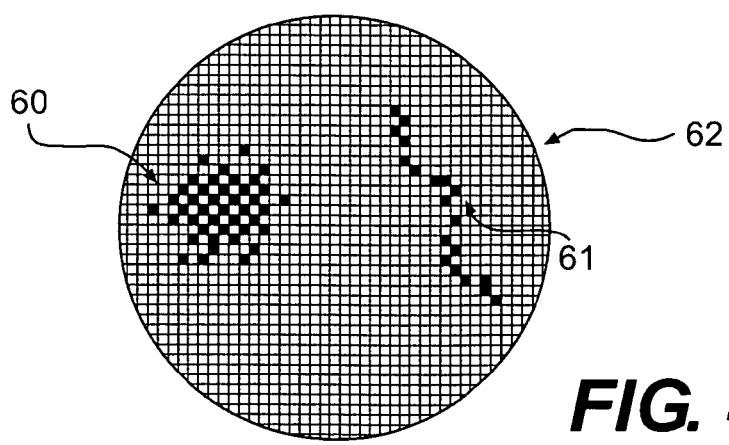
FIG. 4D is a diagrammatic illustration of a sample image of a histogram expansion of a temperature map according to an exemplary disclosed embodiment.

Display 30 may be configured to display an image of at least one temperature map and/or histogram expansion of the temperature map. FIGS. 4A and 4B illustrate cross-sectional views of exemplary working materials. FIGS. 4C and 4D illustrate images of a temperature map and a histogram expansion of the temperature map corresponding to the exemplary materials shown in FIGS. 4A and 4B.

FIG. 4A illustrates a cross-sectional view of a particulate trap type exhaust treatment device 22. Within an outer housing 48, exhaust treatment device 22 may include a filter mesh working material 50. Filter mesh working material 50 may include a blockage 52 where, for example, filter mesh working material 50 has melted and fused together or where particulate matter has accumulated. Filter mesh working material 50 may also include a damaged or defective area such as a tear 53.

FIG. 4B illustrates a cross-sectional view of a catalyst-based exhaust treatment device 22. Within outer housing 48, exhaust treatment device 22 may include a honeycomb working material 54. Honeycomb working material 54 may include a hole 56 where, for example, honeycomb working material 54 has failed. Honeycomb working material 54 may also include a crack 57.

Display 30 may display the temperature map of filter mesh working material 50 or honeycomb working material 54 as a pixilated temperature map image 58, as illustrated by FIG. 4C, wherein each pixel corresponds to a temperature measured by one of the sensor units of temperature sensing devices 26. The color of each pixel may correspond to a particular temperature. For example, warmer and cooler temperatures may be represented by shades of red and blue respectively or, with various shades of grey. Further, the image may constitute a simpler representation, wherein only two or three colors are used. One color may be used to represent temperatures within an expected range. A second color may be used to represent temperatures above the expected range. A third color may be used to represent temperatures below the expected range. FIG. 4C illustrates such an image, wherein the majority of the image is white and select pixels in an area 60 and another area 61 are black, indicating a possible deviation from expected temperature.

The sparsely located black pixels, however, may not provide a definitive indication of whether the working material is experiencing unexpectedly high or low temperatures. The temperature map and/or image 58, however, may be enhanced with, for example, histogram expansion. FIG. 4D illustrates a histogram expansion image 62 of the temperature map shown in FIG. 3C. In image 62, area 60 and area 61 may show more evident concentrations of deviant temperatures. This may more clearly indicate that a possible problem exists in a portion of filter mesh working material 50 corresponding to area 60 or in a portion of honeycomb working material 54 corresponding to area 60 or area 61.

It should be noted that, for ease of discussion, the same images (i.e., FIGS. 4C and 4D) have been discussed as possible images corresponding to either a blockage, as shown in FIG. 4A, or a hole or crack, as shown in FIG. 4B. The images, however, could represent the deviant temperatures with differing colors depending on whether the temperature is above or below the expected temperature. Because holes may result in increased temperatures and blockages may result in decreased temperatures, the images produced for these two types of failures could be represented with differing colors, to enable a viewer to distinguish.

Display 30 may also be configured to display images of rate of temperature change maps. That is, each pixel of the image may display a color associated with a rate of temperature change rather than a temperature measurement.

In addition to displaying the temperature measurements, temperature data may be recorded by system 18 and stored in a memory device. At a later time, this data may be used by controller 28 and/or displayed by display 30. Alternatively or additionally, this data, along with other information, may be provided to an entity external to the work machine for analysis or review by any interested parties such as owners, renters, customers, and/or service technicians. For example, this information may be downloaded (e.g., with a laptop or PDA) or sent to a processing facility as a radio signal, via satellite, or any other type of data link.

In embodiments that employ regeneration, controller 28 may be configured to control operation of regeneration device 32 (or engine 14) based on the determined temperature map or rate of temperature change map. For example, the regeneration process may be turned down or off when a temperature and/or rate of temperature change is determined to be higher than or approaching a predetermined limit. Similarly, the regeneration process may be turned on or up when a temperature and/or rate of temperature change is determined to be lower than expected.

INDUSTRIAL APPLICABILITY

The disclosed system may be suitable to enhance exhaust emissions control for engines. System 18 may be used for any application of an engine. Such applications may include, for example, stationary equipment such as power generation sets or mobile equipment, such as vehicles. The disclosed system may be used for any kind of vehicle, such as, for example, automobiles, work machines (including those for on-road, as well as off-road use), and other heavy equipment.

The temperature maps determined by system 18 may be useful in detecting mechanical failures of exhaust treatment device 22 at an early stage. By detecting these failures early on, maintenance may be performed on system 18 to repair or replace the faulty component before it and/or system 18 experiences significant loss of performance or catastrophic failure. For example, if a minor blockage occurs in exhaust treatment device 22, performance of system 18 may not be significantly affected. If, however, exhaust treatment device 22 is not repaired or replaced at this early stage of failure, the blockage may alter the flow distribution through exhaust treatment device 22. The blockage, while causing a decrease in flow at the location in which it resides, may cause a compensating increase in flow in other areas of exhaust treatment device. These increases in flow may result in elevated temperatures, which may cause additional damage, such as more blockages. Eventually, the blockages may become severe enough to cause not only redistribution of flow, but restriction in flow. Restriction in flow may cause backpressure in exhaust conduit 20, which can result in a loss in performance and possibly damage to engine 14 and/or other components of system 18. In addition, the blockages may reduce the surface area of working material that is exposed to the exhaust stream, which could make exhaust treatment device 22 less effective in its purpose of acting on one or more constituents of the exhaust stream.

System 18 may facilitate detection of failures at an early stage by detecting variations in temperature that result from failures. When a temperature measurement indicates an operating temperature or rate of temperature increase that is higher than expected, it may indicate a flow of exhaust through that section of exhaust treatment device 22 that is higher than normal, possibly resulting from a crack or enlarged opening in the working material. When a temperature measurement indicates an operating temperature lower than expected, it may indicate a flow of exhaust through that section of exhaust treatment device 22 that is lower than expected, possibly resulting from a fusion or blockage in the working material. These types of mechanical failures may be detected at an early stage and repaired before larger portions of the working material fail.

The temperature maps may also be useful for determining whether exhaust treatment device 22 is operating within an expected and/or optimal temperature range. For example, if exhaust treatment device 22 is operating below the expected temperature range, it may not perform at its full potential. For example, the chemical reaction promoted by catalyst-based treatment devices may occur more effectively at higher temperatures. At the other end of the spectrum, if exhaust treatment device 22 is operating above the expected temperature range, it may also result in diminished performance and/or possible failure. For example, if a catalyst-based treatment device is operating above a certain temperature, the chemical reaction may not occur as efficiently. Further, elevated temperatures may cause structural failures such as cracking and/or melting of working materials.

The temperature data measured by system 18 may be used for any other purpose, such as, for example, diagnostics and/or troubleshooting of system 18, prognostics, controlling regeneration and/or engine operation, or any other suitable purpose. System 18 may also be useful for emissions testing or inspection, or for engine and/or exhaust system development.

It will be apparent to those skilled in the art that various modifications and variations can be made to the disclosed exhaust treatment device monitoring system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An exhaust system, comprising:
   an exhaust path configured to direct an exhaust stream away from an engine;
   an exhaust treatment device in the exhaust path and configured to act on one or more substances in the exhaust stream;
   at least one temperature sensing device configured to determine a temperature profile of a surface area of a working material of the exhaust treatment device by determining the temperatures of various portions of the surface area of the working material; and
   a controller configured to generate a temperature map which shows the determined temperature profile of the surface area of the working material of the exhaust treatment device and to determine deviations from an expected temperature map.

2. The system of claim 1, wherein the controller is configured to generate a map of a rate of temperature change of the exhaust treatment device and to determine deviations from an expected rate of temperature change.

3. The system of claim 1, wherein the controller is further configured to enhance the temperature map with histogram expansion.

4. The system of claim 1, wherein the exhaust treatment device includes a particulate trap.

5. The system of claim 1, further including a regeneration device configured to heat the exhaust treatment device, wherein the controller is further configured to control operation of the regeneration device based on the generated temperature map.

6. The system of claim 1, wherein the exhaust treatment device includes a catalyst-based treatment device.

7. The system of claim 1, wherein the at least one temperature sensing device includes at least one infrared temperature sensor.

8. The system of claim 7, wherein the at least one infrared temperature sensor includes an infrared sensor array.

9. The system of claim 1, wherein the at least one temperature sensing device is located adjacent to at least one of an upstream end and a downstream end of the exhaust treatment device.

10. The system of claim 9, wherein the controller is configured to generate temperature maps of both the upstream and downstream end of the exhaust treatment device and to compare the generated temperature maps of the upstream and downstream temperature sensing devices.

11. The system of claim 10, wherein the controller is configured to determine a flow distribution through the exhaust treatment device based on the comparison of the generated temperature maps.

12. A method of monitoring an exhaust treatment device, comprising:
    directing an exhaust stream from an engine to the exhaust treatment device;
    determining a temperature profile of a surface area of a working material of the exhaust treatment device by determining the temperatures of various portions of the surface area of the working material;
    generating a temperature map which shows the determined temperature profile of the surface area of the working material of the exhaust treatment device; and
    determining deviations from an expected temperature map.

13. The method of claim 12, further including generating a map of a rate of temperature change of the exhaust treatment device; and
    determining deviations from an expected rate of temperature change.

14. The method of claim 12, further including enhancing the temperature map with histogram expansion.

15. The method of claim 12, further including displaying at least one of the temperature map and a histogram expansion of the temperature map.

16. The method of claim 12, wherein the exhaust treatment device includes a particulate trap.

17. The method of claim 12, further including controlling operation of a regeneration device associated with the exhaust treatment device based on the generated temperature map.

18. The method of claim 12, wherein the exhaust treatment device includes a catalyst-based treatment device.

19. The method of claim 12, wherein the generating a temperature map includes monitoring infrared radiation emitted from the surface area of the working material.

20. The method of claim 19, wherein the monitoring of infrared radiation is performed by an infrared sensor array.

21. The method of claim 12, wherein generating the temperature map includes generating a temperature map for the working material near at least one of an upstream end and a downstream end of the exhaust treatment device.

22. The method of claim 21, wherein generating the temperature map includes generating a map for the working material at both the upstream end and the downstream end of the exhaust treatment device.

23. The method of claim 22, further including comparing the generated temperature maps of the upstream end and the downstream end of the exhaust treatment device.

24. The method of claim 23, further including determining flow distribution through the exhaust treatment device based on the comparison of the generated temperature maps.

25. A machine, comprising:
an operator station;
at least one traction device;
an internal combustion engine;
an exhaust path configured to direct an exhaust stream away from the internal combustion engine;
an exhaust treatment device in the exhaust path and configured to act on one or more substances in the exhaust stream;
at least one temperature sensing device configured to determine a temperature profile of a surface area of a working material of the exhaust treatment device by determining the temperatures of various portions of the surface area of the working material; and
a controller configured to generate a temperature map which shows the determined temperature profile of the surface area of the working material of the exhaust treatment device and to determine deviations from an expected temperature map.

26. The machine of claim 25, wherein the controller is configured to generate a map of a rate of temperature change of the exhaust treatment device and determine deviations from an expected rate of temperature change.

27. The machine of claim 25, wherein the controller is further configured to enhance the temperature map with histogram expansion, the system further including a display configured to display at least one of the temperature map and a histogram expansion of the temperature map.

28. The machine of claim 25, wherein the exhaust treatment device includes a particulate trap, the system further including a regeneration device configured to heat the particulate trap, the controller being further configured to control operation of the regeneration device based on the generated temperature map.

29. The machine of claim 25, wherein the exhaust treatment device includes a catalyst-based treatment device, the system being configured to regenerate the catalyst-based treatment device, the controller being further configured to control regeneration of the catalyst-based treatment device based on the generated temperature map.

30. The machine of claim 25, wherein the at least one temperature sensing device includes one or more infrared sensor arrays located adjacent to at least one of an upstream end and a downstream end of the exhaust treatment device.

31. The machine of claim 30, further including one or more infrared sensor arrays at both ends of the exhaust treatment device, wherein the controller is further configured to
generate temperature maps of both the upstream and downstream ends of the exhaust treatment device
compare the generated temperature maps and
determine flow distribution through the exhaust treatment device based on the comparison of the generated temperature maps.

* * * * *